(12) United States Patent
Liu

(10) Patent No.: US 6,658,051 B1
(45) Date of Patent: Dec. 2, 2003

(54) ELECTRICAL ISOLATION TECHNIQUES FOR DSL MODEM

(75) Inventor: Dongtai Liu, Fremont, CA (US)

(73) Assignee: Centillium Communications, Inc., Fremont, CA (US)

( * ) Notice: Subject to any disclaimer, the term of this patent is extended or adjusted under 35 U.S.C. 154(b) by 505 days.

(21) Appl. No.: 09/703,324

(22) Filed: Oct. 31, 2000

(51) Int. Cl.[7] .............................. H04B 1/38; H04L 5/16
(52) U.S. Cl. .................................. 375/222; 379/93.05
(58) Field of Search ..................... 379/93.05, 412, 379/413, 93.6, 377, 399.01; 375/219, 222, 220, 257, 377

(56) References Cited

U.S. PATENT DOCUMENTS

| | | | |
|---|---|---|---|
| 5,369,666 A | 11/1994 | Folwell et al. | 375/8 |
| 5,555,293 A | 9/1996 | Krause | 379/98 |
| 5,574,404 A | 11/1996 | Le Bars | 330/308 |
| 5,655,010 A | 8/1997 | Bingel | 379/93.28 |
| 5,774,541 A | 6/1998 | Krause | 379/405 |
| 5,875,235 A | 2/1999 | Mohajeri | 379/93.36 |
| 6,081,586 A * | 6/2000 | Rahamim et al. | 379/93.29 |
| 6,169,801 B1 * | 1/2001 | Levasseur et al. | 379/413 |
| 6,351,530 B1 * | 2/2002 | Rahamim et al. | 379/399.01 |
| 6,359,973 B1 * | 3/2002 | Rahamim et al. | 379/93.05 |
| 6,407,691 B1 * | 6/2002 | Yu | 341/155 |
| 6,445,330 B1 * | 9/2002 | Thomsen et al. | 341/172 |
| 2002/0126806 A1 * | 9/2002 | Rahamim et al. | 379/93.05 |
| 2002/0186824 A1 * | 12/2002 | Sabodash et al. | 379/93.05 |

FOREIGN PATENT DOCUMENTS

| | | | |
|---|---|---|---|
| WO | WO 99/48272 | * | 9/1999 |
| WO | WO 00/30333 | | 5/2000 |
| WO | WO 00/30336 | | 5/2000 |

OTHER PUBLICATIONS

PCT International Search Report, International Application No. PCT/US01/45627, Dec. 18, 2002, 5 pages.

* cited by examiner

*Primary Examiner*—Jean B. Corrielus
(74) *Attorney, Agent, or Firm*—Fenwick & West LLP

(57) ABSTRACT

One embodiment of the present invention provides a DSL modem for coupling a transmission line to a communication system interface, the modem having digital isolation and power isolation. Another embodiment of the present invention provides a method for communicating power signals and data signals between a first-side of a modem and a second-side of the modem, the first and second sides of the modem being electrically isolated from one another.

5 Claims, 10 Drawing Sheets

ELECTRICAL ISOLATION TECHNIQUES FOR DSL MODEM

BACKGROUND OF THE INVENTION

1. Field of the Invention

The invention relates to telecommunications, and more particularly, to isolation techniques in a digital subscriber line (DSL) modem.

2. Description of the Related Art

A conventional telephone transmission line is typically comprised of a pair of copper conductors that connect a telephone set to the nearest central office, digital loop carrier equipment, remote switching unit or any other equipment serving as the extension of the services provided by the central office. This pair of copper conductors, which is also referred to as a twisted pair, has its leads named as tip and ring. The tip and ring nomenclature is derived from the electrical contacts of an old-style telephone plug.

In general, a digital subscriber line is comprised of two DSL modems coupled to one another by such a twisted pair. The transmit (Tx) and receive (Rx) signals of DSL communications are therefore carried on the twisted pair. Some DSL systems also allow for Plain Old Telephone Service (POTS) communications, such as voice and facsimile data, to be transmitted on the same twisted pair. In such a DSL system, various signal modulation, separation and isolation techniques can be employed to ensure that the high frequency DSL data is received by the intended DSL modem, and that the low frequency POTS data is received by the intended POTS line card.

For example, discrete multitone (DMT) is a modulation technique commonly employed in various digital subscriber line (XDSL) communication systems (e.g., asynchronous DSL (ADSL) systems). A DMT line code comprises multiple bins or subchannels implemented through a Discrete Fourier Transform (DFT). Each bin is independently modulated to some carrier frequency. The number of bins available to carry information is generally equal to or slightly less than half of the DFT size. Each bin of a DMT line code employs a two-dimensional signal (e.g., a phase and amplitude modulated signal) equivalent to that of a passband single carrier system. Quadrature amplitude modulation (QAM) is a modulation method that is used to encode a variable number of bits into such a two-dimensional signal, where the bits are mapped into the in-phase and quadrature components of a complex symbol that is typically converted to an analog form, and then transmitted in the corresponding bin.

In addition to such modulation techniques, various separation and isolation techniques are available to ensure that the high frequency DSL data is received by the intended DSL modem, and that the low frequency POTS data is received by the intended POTS line card. For example, a common separation technique is to use a splitter, which separates low frequency POTS data from high frequency DSL data. Other separation methods are available, depending on factors such as the particular system involved and whether the system is deployed at the central office or the customer premises.

Isolation techniques, on the other hand, are required to isolate the signal equipment, such as the DSL modem circuitry and the POTS line card circuitry, from the common-mode line voltage of the telephone transmission line. For instance, a discrete subscriber line interface circuit (SLIC) is typically used to isolate POTS line card circuitry from the common-mode line voltage of the transmission line. On the DSL side, however, a coupling transformer is typically used to isolate the DSL modem circuitry from common-mode line voltage of the transmission line. This transformer serves other purposes as well. For example, it is used to match the transmitter impedance to the DSL line impedance. Additionally, the transformer may provide echo cancellation and or line impedance matching as part of the hybrid balance network. Such a DSL coupling transformner provides an easy design. solution and can be used with a number of line drivers.

However, a DSL coupling transformer is also associated with. significant disadvantages. For example the per unit cost associated with such DSL coupling transformers, as well as the physical space (e.g., on a printed circuit board) that is consumed by the DSL coupling transformer are considerable. Furthermore, DSL coupling transformers exhibit various undesirable performance characteristics, such as non-linear distortion (e.g., typically around –70 dB) and limited bandwidth. Moreover, the is adverse effects of such undesirable performance characteristics increase as the bandwidth requirement of a communication system increases. For example, a symmetric high-bit-rate DSL (SHDSL) system requires approximately thirty times (in octaves) more bandwidth than an ADSL system. A DSL coupling transformer in an SHDSL system, therefore, is a significant performance limiting component.

In addition, there are numerous transformer parameters that adversely affect both the remote and local modems in a DSL communication system. One such parameter is self inductance, which is the ability of a transformner coil to oppose changes in signal current. With respect to the remote DSL modem, this parameter causes reflection of the Tx signal, as well as attenuation of the Rx signal at the lower bins of the DMT line code. On the local side of the communication system, the DSL modem experiences harmonic distortion of the Tx signal, and cross modulation of both the Rx and Tx signals. Moreover, attenuation of the Rx signal and degradation of echo cancellation occur at the lower bins of the line code.

Another transformer parameter that can adversely affect a DSL communication system is referred to as leakage inductance. This parameter is particularly undesirable when it combines with stray capacitance to form a resonant circuit that causes an oscillation that typically manifests as high-frequency noise. As a result, the remote DSL modem experiences reflection of the Tx signal, as well as attenuation of the Rx signal at the higher bins of the line code. On the local side, the DSL modem is subjected to echo cancellation degradation, and attenuation of the Rx signal at higher bins of the line code.

Also, the non-linearity of a transformer output subjects both the remote and local DSL modems to harmonic distortion at the lower bins, and cross modulation at all bins included in the line code. Another parasitic element of a transformer is its DC resistance, which contributes to power efficiency degradation at both the remote and local DSL modems. Additionally, the interwinding capacitance of the transformer causes increased noise floor due to common-mode noise. This is because interwinding capacitance degrades the isolation of the transformer, and noise can therefore pass between the primary and secondary windings. As such, the common-mode noise (noise common to both the tip and ring terminals) will increase.

Another problem associated with transformers in DSL applications is that the transformer is required to work over a large frequency span (e.g., a frequency ratio of 30 for ADSL) under fairly stringent conditions defined by various industry regulatory standards. In addition, the cumbersome magnetic component of a typical DSL coupling transformer is undesirable in that it increases costs, occupies significant physical space and has a non-trivial weight.

In light of all the problems associated with transformers, it is desirable to develop technologies that offer alternatives having better performance characteristics given the defined industry standards, and desirable physical characteristics (e.g., small size and low weight). One such technology is a modem design that uses optoisolators to isolate data, while using the current of the telephone transmission line to supply the isolated section with power. In the case of a DSL modem, however, the power required for the analog transceiver is much greater than could be supplied by the current of the telephone transmission line. As such, this approach is not practical in a DSL modem system.

There is a need, therefore, for an isolation technique that does not adversely affect DSL modem performnance. The technique should provide a solution that can be optionally implemented in a compact form, and should provide the requisite power for proper DSL modem function.

BRIEF SUMMARY OF THE INVENTION

One embodiment of the present invention provides a DSL modem for coupling a transmission line to a communication system interface, the modem including a digital isolation means operatively coupled between an analog front-end and a digital signal processor, the digital isolation means for electrically isolating the analog front-end from the digital signal processor, and a power isolation means that receives input power from the communication system interface, the power isolation means having a first output coupled to the analog front-end, and a second output coupled to the digital signal processor, the power isolation means for electrically isolating the input power from the first and second outputs.

Another embodiment of the present invention provides a DSL modem for coupling a transmission line to a communication system interface, the modem including a digital isolation means operatively coupled between an analog front-end having a first ground and a digital signal processor having a second ground, the digital isolation means for electrically isolating the first ground from the second ground, and a power isolation means that receives input power from the communication system interface, the power isolation means having a first power output coupled to the analog front-end, and a second power output coupled to the digital signal processor, the power isolation means for electrically isolating the input power output from the first and second power outputs.

Another embodiment of the present invention provides a DSL modem for coupling a transmission line to a communication system interface, the modem including a switching converter having an input for receiving an input power signal from the communication system interface, the switching converter for generating a switching signal having a switching period associated with an active portion and a non-active portion, and a magnetic link having a power input for receiving the input power signal, and a data input for receiving a data signal, the magnetic link operatively coupled to the switching signal of the switching converter, the magnetic link for transferring the input power signal during the active portion of the switching period, and for transferring the data signal during the non-active portion of the switching period.

Another embodiment of the present invention provides a method for communicating power signals and data signals between a first-side of a modem and a second-side of the modem by electrically isolating the first-side of the modem from the second-side of the modem using a magnetic link, generating a switching signal having a switching period associated with an active portion and a non-active portion, transferring an input power signal across the magnetic link during the active portion of the switching period, and transferring an input data signal across the magnetic link during the nonactive portion of the switching period.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 6b is a graph illustrating the relationship between frequency and the impedance of common-mode filters shown in FIG. 6a.

DETAILED DESCRIPTION OF THE INVENTION

Figure 1:
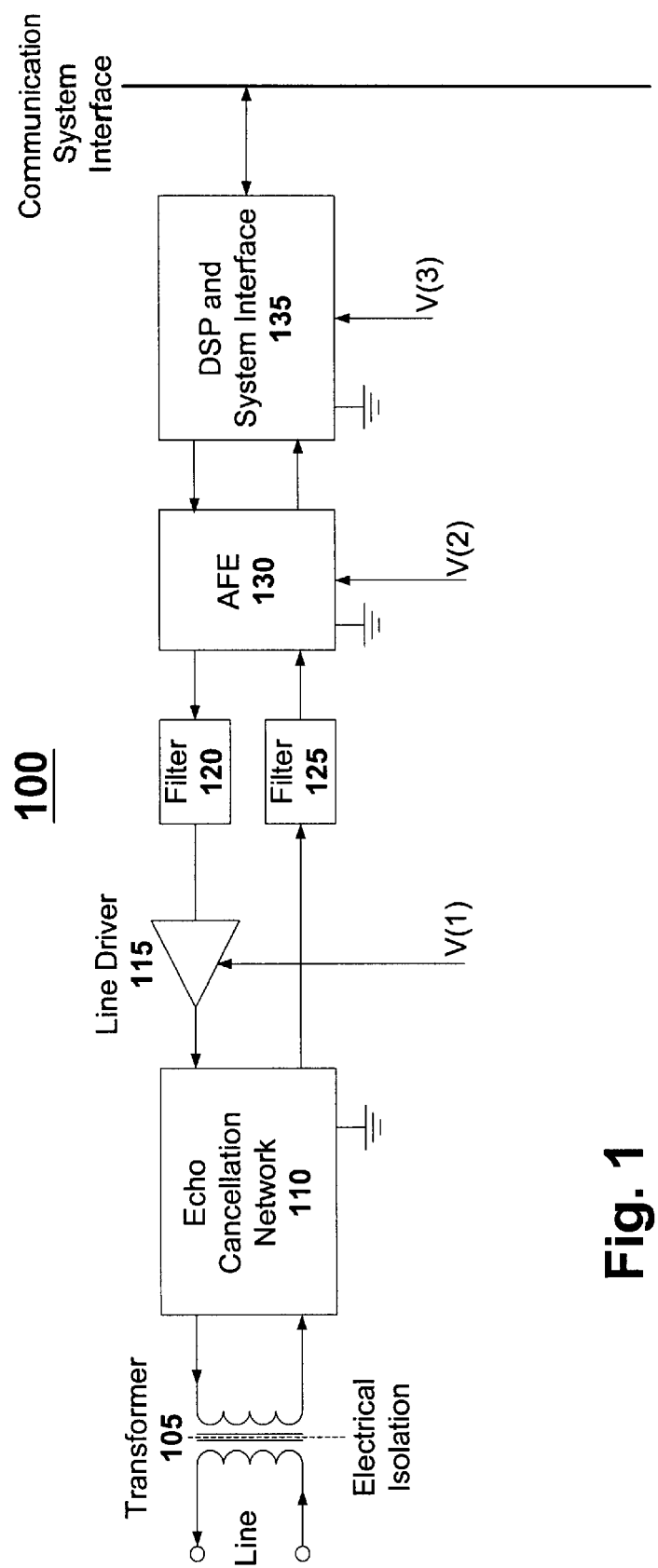
FIG. 1 is a block diagram of a conventional DSL modem having a coupling transformer between the transmission line and the analog data path of the modem.

FIG. 1 is a block diagram of a conventional DSL modem having a coupling transformer between the transmission line and the analog data path of the modem. DSL modem 100 is comprised of a coupling transformer 105, an echo cancellation network 110, a line driver 115, filters 120 and 125, an analog front-end (AFE) 130, and a digital signal processor (DSP) and system interface 135 (referred to generally as DSP 135). Transformer 105 is coupled to the transmission line, while the DSP 135 is coupled to the communication system interface.

Transformer 105 couples the transmission line to the analog circuitry of DSL modem 100. The analog output of transformer 105, from the perspective of the line, is applied to echo cancellation network 110, which removes unwanted echoes from the signal on the transmission line. Echoes are typically caused by impedance mismatches along an analog line. The output of the echo cancellation network 110 is filtered by filter 125 and applied to AFE 130. AFE 130 converts the analog signal to its digital equivalent and applies that digital signal to DSP 135. The output of DSP 135, from the perspective of the transmission line, is coupled with the communication system interface. Power is provided to DSP 135, AFE 130 and line driver 115. Coupling transformer 105 fully isolates the circuitry of DSL modem 100 from the transmission line.

The preceding discussion was directed to data flowing from the transmission line through DSL modem 100. Those skilled in the art understand that data on the transmission line is full duplex and bi-directional. As such, digital data can travel from the communication system interface to DSP 135. A digital output of DSP 135 is then applied to AFE 130, which converts the digital signal to its analog equivalent. The analog signal is then filtered by filter 120, and applied to analog line driver 115. The output of the analog line driver is then applied to echo cancellation network 110 for transmission onto the transmission line via transformer 105. Other conventional modem configurations are possible, and the configuration shown is for the purpose of facilitating discussion.

Figure 2:
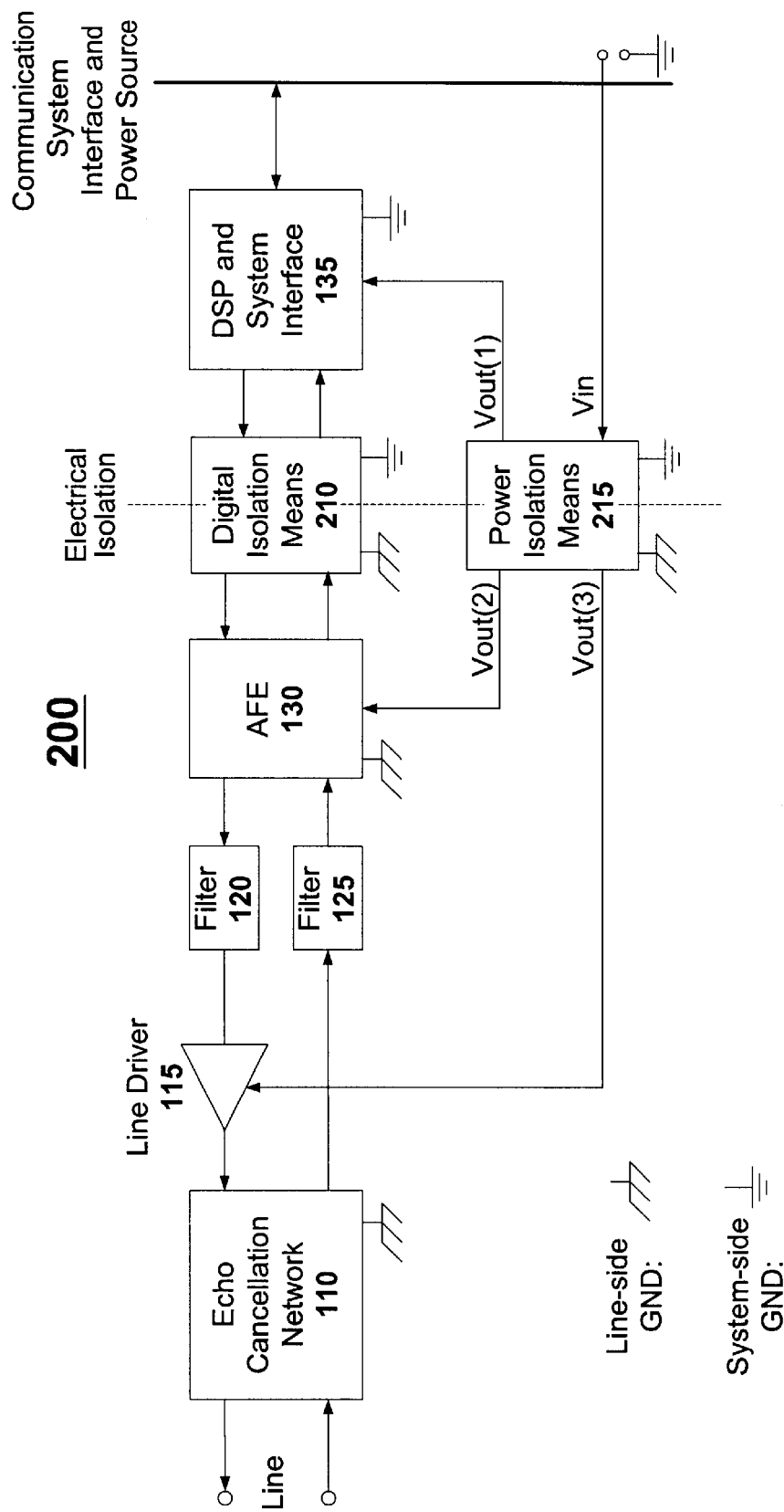
FIG. 2 is a block diagram of a DSL modem having digital and power isolation in accordance with one embodiment of the present invention.

FIG. 2 is a block diagram of a DSL modem having digital and power isolation in accordance with one embodiment of the present invention. DSL modem 200 includes echo cancellation network 110, line driver 115, filters 120 and 125, a digital isolation means 210, a power isolation means 215, and DSP 135. Note that there is no coupling transformer 105 included in this embodiment, as the transmission line is coupled directly to echo cancellation network 110 of DSL modem 200. DSP 135 and the power isolation means 215 are respectively coupled to the communication system interface and power source. The communication system interface might be, for example, a peripheral component interconnect (PCI) bus or a universal serial bus (USB). The communication system interface is generally coupled to a network or backbone that provides further processing or transmission of data from DSP. 135. A typical protocol implemented in the transmission of this data is the asynchronous transfer mode (ATM). Those skilled in the art will recognize other protocols that can be implemented as well.

The line of electrical isolation includes digital isolation means 210 and power isolation means 215. Digital isolation means 210 electrically isolates AFE 130 from DSP 135. As such, digital duplex data can be transmitted between AFE 130 and E)SP 135, but the ground plane associated with AFE 130 is isolated from the ground plane associated with DSP 135. Thus, in the event that the digital data paths are subjected to a system side failure mode (e.g., a short-circuit in the communication system interface or back plane), that failure mode will be prevented from propagating to the transmission line. Likewise, a line-side failure will be prevented from propagating to the system-side.

Power isolation means 215, on the other hand, isolates the power source, Vin, from the power outputs Vout(1), Vout(2) and Vout(3). Each of these power outputs can operate independently of each other. In the event of a power problem (e.g., assume that line driver 115 malfunctions thereby short-circuiting Vout(3)), Vin will be protected from the short-circuit. Likewise, the remaining power outputs (e.g., Vout(1) and Vout(2)) will be protected from the short-circuit. Such power isolation. allows DSL modem 200 to be powered by a system-side power source that is referenced to a system-side ground plane (system-side GND). However, that system-side ground plane is isolated from the line-side ground plane (line-side GND). As such, variations in the line-side ground plane will not be intermingled with the system-side ground plane, and undesirable fluctuations in Vin are prevented.

By providing the line of electrical isolation as both a digital isolation means and a power isolation means in accordance with the present invention, the relevant industry regulatory standards are satisfied, the undesirable DSL coupling transformer is eliminated, and DSL modem 200 is fully powered from a system-side power source. Various embodiments of both digital isolation means and power isolation means in accordance with the present invention will now be discussed.

For purposes of clarity, the circuitry including coupling transformer 105, echo cancellation network 110, line driver 115, filters 120 and 125, and analog front-end (AFE) 130 are sometimes (whether collectively or some portion thereof) referred to as a data access arrangement or a hybrid circuit. Those skilled in the art will understand that the particular data access arrangement illustrated is one of many such configurations, and the configuration shown is not intended to limit the scope of the present invention in any way. For example, various other components that are not illustrated in the figures herein might be included in different DSL modem configurations. Similarly, components that are illustrated in the figures herein might not be included in other DSL modem configurations.

Figure 3:
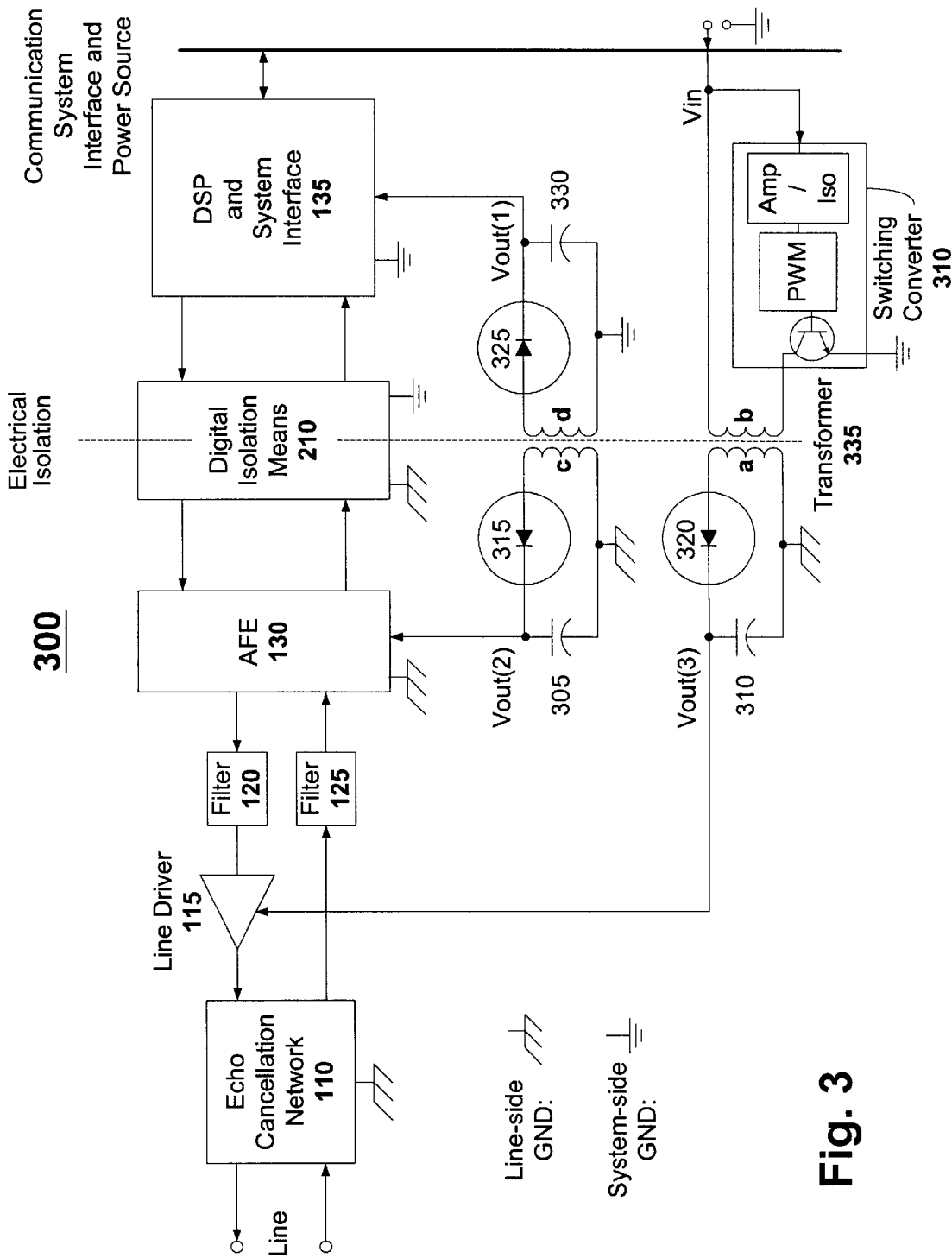
FIG. 3 is a block diagram of a DSL modem having power isolation that includes a magnetic link in accordance with one embodiment of the present invention.

FIG. 3 is a block diagram of a DSL modem having power isolation that includes a magnetic link in accordance with one embodiment of the present invention. DSL modem 300 includes echo cancellation network 110, line driver 115, filters 120 and 125, AFE 130, digital isolation means 210, DSP 135, capacitors 305, 310, and 330, diodes 315, 320, and 325, a switching converter 310, and a transformer 335. The transmission line is coupled to modem 300 without a coupling transformer 105. In the embodiment shown, the transmission line is coupled directly to echo cancellation network 110 of DSL modem 300. In alternative embodiments, modem 300 might be coupled to the transmission line by another component. The DSP 135 is coupled to the communication system interface, and the switching converter 310 and transformer 335 are coupled to a system-side power source.

In this embodiment, duplex data is exchanged between AFE 130 and DSP 135 via digital isolation means 210 as discussed with reference to FIG. 2. Power isolation, on the other hand, is provided by filtering capacitors 305, 310, and 330, rectifying diodes 315, 320, and 325, switching converter 310, and transformer 335, which will now be explained in more detail. This configuration might be referred to as a fly-back converter. Briefly, energy is stored in inductor b during the first half of the switching period when the switching converter 310 is switched on. During the second half of the switching period, the switching converter 310 is switched off, and the energy stored in inductor b is transferred to the corresponding loads. Other conventional converter configurations and topologies can be used to implement the power isolation in accordance with the present invention as well. For example, a forward converter, a half-bridge converter, a full-bridge converter or a push-pull converter could be used.

Vin can be any source from the system-side that can provide sufficient power to the DSL modem componentry. For example, Vin may be a 5 volt DC source capable of delivering 100 watts. In such an embodiment, switching converter 310 converts Vin to an AC signal having a peak voltage of approximately 5 volts referenced to the system-side ground. In the embodiment shown, switching converter 310 includes a pulse width modulator (PWM) coupled to the base of a power transistor, a reference amplifier (Amp) and an isolation circuit (Iso). Other switching converter configurations can be used as well, such as a voltage controlled oscillator in the place of the PWM. The frequency of the output signal of switching converter 310 depends, for example, on the switching speed of switching converter 310 and the bandwidth of transformer 335. The output signal output by switching converter 310 is applied to transformer 335.

In an alternative embodiment, Vin is provided by an AC voltage source from the system-side. In such an embodiment, a frequency converter (not shown) could be used in place of switching converter 310. Alternatively, no frequency converter would be necessary depending on the desired frequency of the Vin source and the frequency of the available AC voltage source from the system-side.

In the embodiment shown, transformer 335 has a magnetic core and is comprised of inductors a, b, c, and d. However, as will be understood in light of this disclosure, other transformer configurations can be used as well. As can be seen, transformer 335 provides power to three different loads. The first load (DSP 135) is powered by Vout(1), the second load (AFE 130) is powered by Vout(2), and the third load (line driver 115) is powered by Vout(3). The magnitude of Vout(1) is a function of the turns ratio between inductors b and d (e.g., Vout(1)=Vin (d/b)). The magnitude of Vout(2) is a function of the turns ratio between inductors b and c (e.g., Vout(2)=Vin (c/b)). The magnitude of Vout(3) is a function of the turns ratio between inductors b and a (e.g., Vout(3)=Vin (a/b)).

The output voltage across inductor d is half-wave rectified by diode 325 and filtered by capacitor 330 to produce Vout(1), which is provided to DSP 135. Vout(1) is referenced to the system-side ground plane. The output voltage across inductor c is half-wave rectified by diode 315 and filtered by capacitor 305 to produce Vout(2), which is provided to AFE 130. Vout(2) is referenced to the line-side ground plane. The output voltage across inductor. a is half-wave rectified by diode 320 and filtered by capacitor 310 to produce Vout(3), which is provided to line driver 115. Vout(3) is referenced to the line-side ground plane. The value of each filter capacitor (e.g., 305, 310, 330) depends, for example, on the value of the corresponding load resistance (relevant to the discharge time constant of the RC circuit formed by the capacitor and the load resistance), and the frequency of switching converter 310.

Each power output is isolated from Vin as well as from the other power outputs. The power isolation means can be configured to accommodate any necessary power requirements. The embodiment shown is an example of one such configuration and is not intended to limit the scope of the present invention. Numerous other configurations are possible in light of this disclosure, and depending on the given power requirements. For example, full-wave rectification and or additional filtering can be provided. Additionally, more or less power outputs can be implemented depending on the need for such outputs. Also, switching converter 310 can have a number of configurations. For example, it might include a voltage controlled oscillator instead of a pulse width modulator.

Figure 4A:
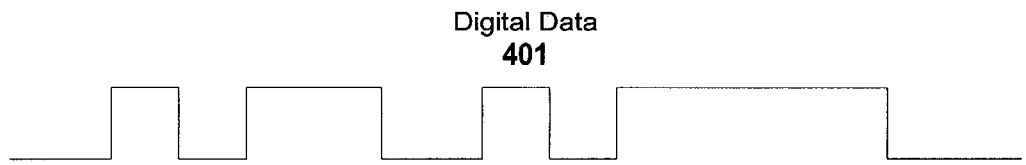
FIG. 4a is an example of a typical digital data signal.

FIG. 4a is an example of a typical digital data signal. Data is encoded in digital data signal 401 based on the duration of high and low states in between certain state transitions. At some points in signal 401 where there are repetitive state transitions, signal 401 effectively resembles a AC signal having a some repetitive cycle. At other points in signal 401, however, there are significant durations of one state or the other. Here, signal 401 effectively resembles a DC signal. Thus, the frequency of an average digital data signal can range from approximately DC (e.g., 10 Hz) to very high. (e.g., 500 MHz).

Figure 4B:
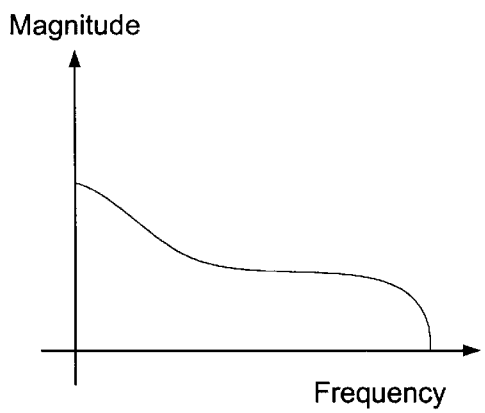
FIG. 4b illustrates the frequency range of a typical digital data signal.

FIG. 4b illustrates the frequency range of a typical digital data signal. The bandwidth of a device for processing such a signal would generally have to match or exceed that frequency range in order to receive all of the data encoded in the digital data signal. In general, transformers do not have the necessary bandwidth requirement to process a typical digital data signal. Thus, the digital data signal must be manipulated so that it can be more effectively processed by a transformer. For example, once the frequency range that a particular transformer operates within is known, then a digital data signal to be passed through that transformer can be modulated to that frequency range.

Figure 4C:
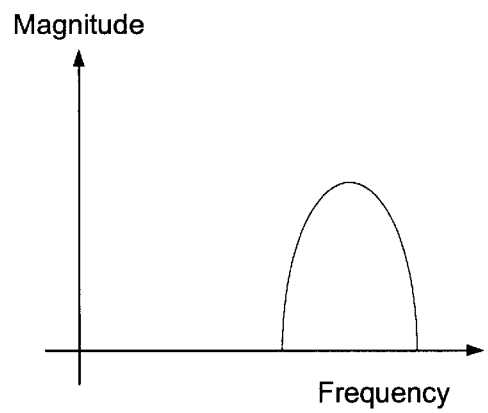
FIG. 4c illustrates the frequency range of a digital data signal that has been modulated to facilitate processing of the digital data signal in accordance with one embodiment of the present invention.

FIG. 4c illustrates the frequency range of a digital data signal that has been modulated to facilitate processing of the digital data signal in accordance with one embodiment of the present invention. The frequency range of the modulated digital signal can very depending on the bandwidth of the device through which the modulated digital signal must pass. In one embodiment, the frequency range can be from approximately 30 KHz to 1 MHz, although numerous other frequency ranges can be used depending on, for example, the type of device being used to transfer the modulated digital signal.

Figure 4D:
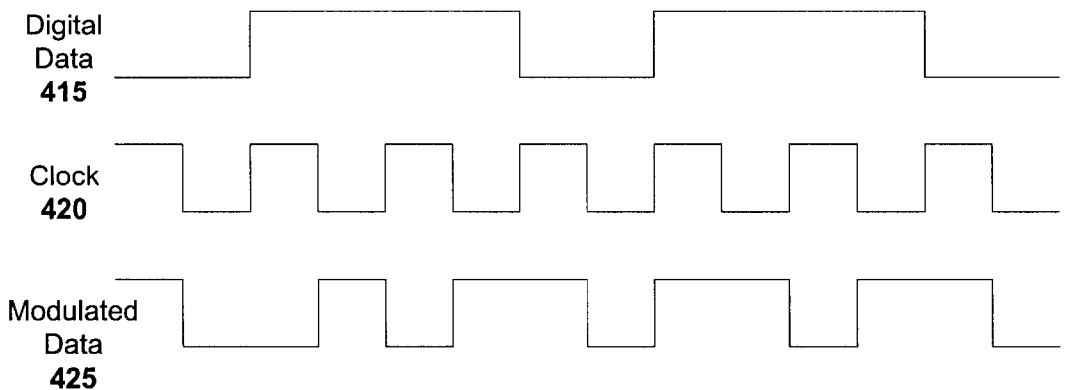
FIG. 4d illustrates one modulation technique that can be used to facilitate processing of a digital data signal in accordance with one embodiment of the present invention.

FIG. 4d illustrates one modulation technique that can be used to facilitate processing of a digital data signal in accordance with one embodiment of the present invention. Here, a clock signal 420 is used as a data carrier. More specifically, the polarity of digital data signal 415 is inverted when clock signal 420 is in its high state. This modulation scheme removes all frequencies below one half of the clock frequency as illustrated by the resulting modulated signal 425. As such, a very small signal transformer (e.g., toroid or printed circuit board transformer) can be used to transfer the modulated digital signal 425. Error correction techniques can be implemented as well in order to ensure a more robust and reliable transfer of modulated digital signal 425.

Other modulation techniques can be employed as well. For example, the polarity of digital data signal 415 can be inverted when clock signal 420 is in its low state. Alternatively, a signal other than a clock signal can be used as a data carrier (assuming that signal has a sufficient repetitive quality that will result in a modulated data signal 425 that can be effectively processed by the transferring device (e.g., toroidal transformer). Alternatively, frequency modulation techniques can be used.

Figure 5A:
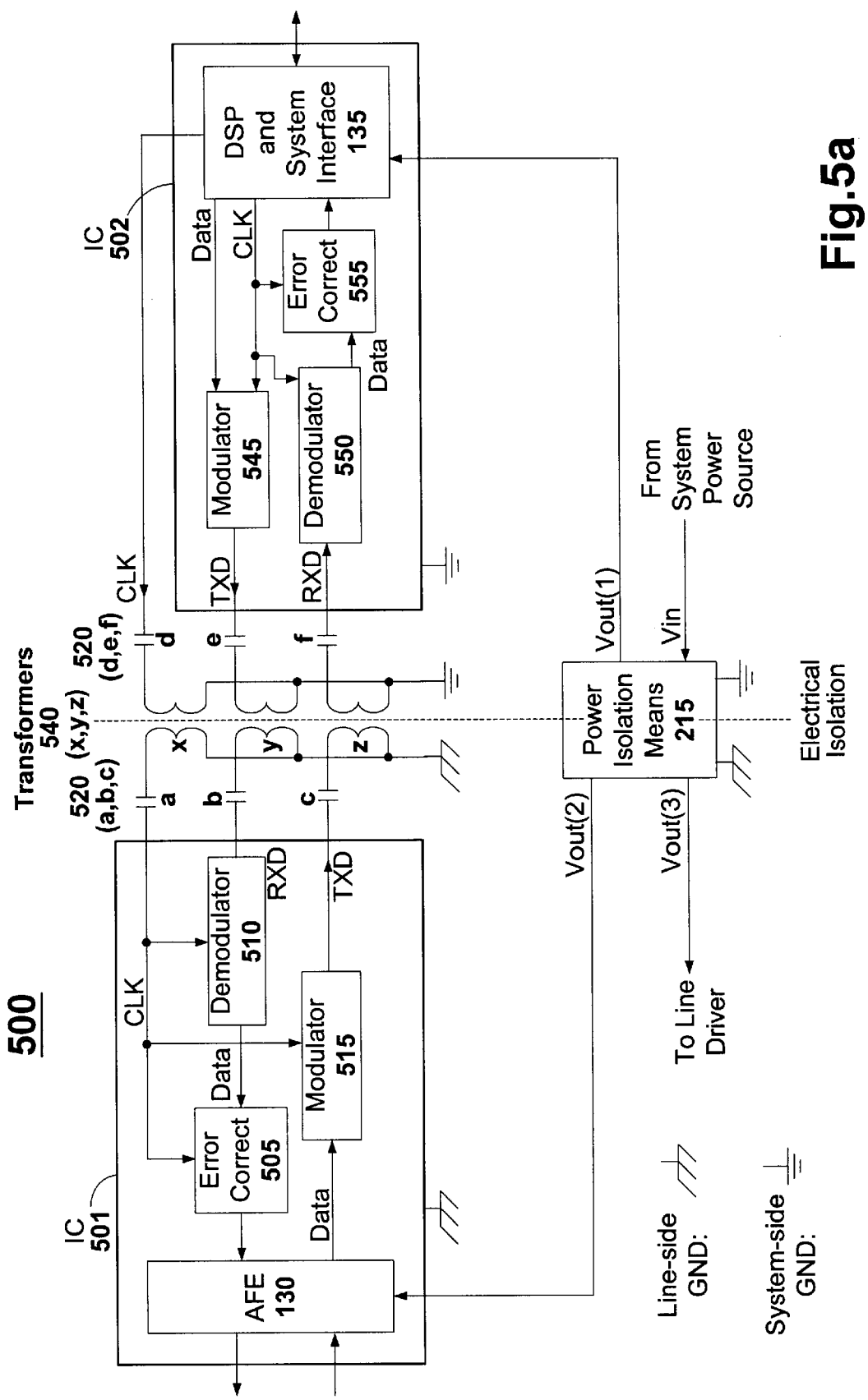
FIG. 5a is a block diagram of a DSL modem having digital isolation that includes magnetic links in accordance with one embodiment of the present invention.

FIG. 5a is a block diagram of a DSL modem having digital isolation that includes magnetic links in accordance with one embodiment of the present invention. DSL modem 500 includes an integrated circuit (IC) 501, an IC 502, a number of coupling capacitors 520 (e.g., a, b, c, d, e, f), a number of transformers 540 (e.g., x, y, z), and power isolation means 215. IC 501 further includes AFE 130, an error correction module 505, a demodulator 510, and a modulator 515. IC 502 further includes a modulator 545, a demodulator 550, an error correction module 555, and DSP 135. The components included in either IC 501 and IC 502 can also exist as separate circuits or modules. In addition, the components included in either IC 501 and IC 502 can be implemented, for example, in hardware, software, firmware or any combination thereof. Other components that might be included in modem 500, such as buffers, line driver 115, filters 120 and 125, and echo cancellation network 110, are not shown in FIG. 5a.

Transformers 540x, 540y and 540z can be small, magnetic core transformers, such as toroidal or printed circuit board transformers. In one embodiment, transformers 540x, 540y, and 540z are implemented using toroid transformers having a diameter of approximately 2 to 6 millimeters, each winding having approximately 2 to 6 turns. However,. numerous other transformer configurations can be used depending on, for example, size and bandwidth constraints. Because the transformer is deployed in the digital environment of DSL modem 500, the performance of DSL modem 500 is not affected by any parasitic parameters of transformers 540. The coupling capacitors 520a–f are used to block undesirable DC signals in order to protect the corresponding transformers 540x–y. Note that IC 501 is coupled to the line-side ground plane, while IC 502 is coupled to the system-side ground plane.

Data Transmitted From the DSP to AFE

Digital data is received by DSP 135 from the communication system interface (not shown). Generally, DSP 135 is the engine used to implement digital filters and DSL protocols as is conventionally done. The resulting digital data from DSP 135 is then applied to modulator 545, which modulates the data to a frequency range that will facilitate the transferring of the data through transformer 540y. A clock signal (CLK) is also provided to modulator 545 by DSP 135. The clock signal may be adapted from a clock source included in the communication system interface, or may originate from DSP 135. In this embodiment, the data signal is modulated using the clock signal as a data carrier as explained with reference to FIG. 4d. Other modulation techniques, however, can be used in accordance with this disclosure.

The output (TXD) of modulator 545 is applied to transformer 540y. The TXD signal is transferred across the magnetic link associated with transformer 540y, and is received by demodulator 510. This received signal (RXD) is then demodulated using the clock signal (CLK) that was used in the modulation process performed by modulator 545. In this embodiment, the clock signal is made available to demodulator 510 (and generally to IC 501) by transferring it from DSP 135 via a magnetic link associated with transformer 540x.

In this embodiment, the output data of demodulator 510 is applied to error correction module 505 to ensure the data is reliable. The clock signal (CLK) is provided to error correction module 505 to facilitate the error checking process. A typical error correction technique that can be implemented by error correction module 505 is cyclical redundancy checking (CRC), although other error checking techniques can be employed as well. Whether error correction techniques are employed depends on factors such as the required level of data accuracy and robustness of the data transfer. The verified output of error correction module 505 is then applied to AFE 130 for conversion to an analog equivalent signal that can be transmitted over the transmission line (not shown).

Data Transmitted From the AFE to DSP

Analog data is received by AFE 130 from the transmission line via a hybrid circuit (not shown). AFE 130 converts the analog data into its digital equivalent and provides that digital data to modulator 515, which modulates the data to a frequency range that will facilitate the transferring of the data through transformer 540z. In this embodiment, the data is modulated using the clock signal (CLK) from DSP 135 as a data carrier as previously explained with reference to FIG. 4d. Recall that the clock signal (CLK) from DSP 135 is similarly used as the data carrier to facilitate the transferring of data from DSP 135 to AFE 130, and that this clock signal is made available to IC 501 as it is transferred from DSP 135 via a magnetic link associated with transformer 540x.

The output (TXD) of modulator 515 is applied to transformer 540z. The TXD signal is transferred across the magnetic link associated with transformer 540z, and is received by demodulator 550. This received signal (RXD) is then demodulated using the clock signal (CLK) that was used in the modulation process performed by modulator 515. The output data of demodulator 550 can optionally be applied to error correction module 555 to ensure accuracy of the data transfer as explained above. The verified output of error correction module 555 is then applied to DSP 135 for processing so that it can be transmitted to the communication system interface (not shown).

Just as data transfers from DSP 135 to AFE 130 can be performed using a number of modulation schemes, so can data transfers from AFE 130 to DSP 135. Generally, the modulation scheme employed in one data transfer direction (e.g., upstream) is consistent with the modulation scheme employed in the other data transfer direction (e.g., downstream). However, consistency of modulation schemes used is not required in order to practice the present invention.

Power isolation means 215 provides power to various components of DSL modem 500. In the embodiment shown, Vin of power isolation means 215 is supplied by a system side power source. The power output Vout(1), which is referenced to the system-side ground plane, provides power to DSP 135. The power output Vout(2), which is referenced to the line-side. ground plane, provides power to AFE 130. The power output Vout(3), which is referenced to the line-side ground plane, provides power to line driver 115 (not shown). One possible configuration of power isolation is illustrated in FIG. 3, although those skilled in the art will recognize other configurations in light of this disclosure.

Figure 5B:
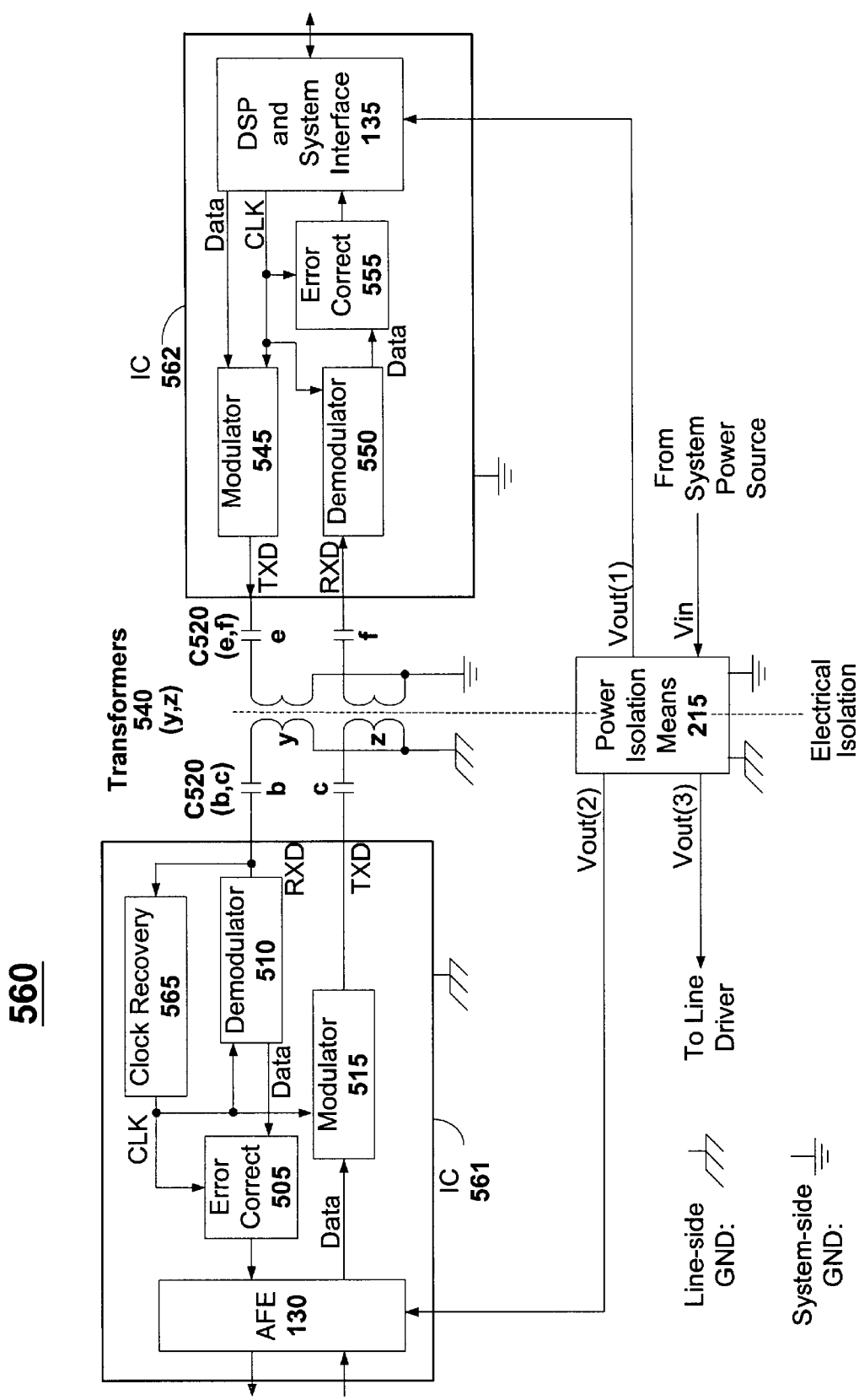
FIG. 5b is a block diagram of a DSL modem having digital isolation that includes magnetic links in accordance with another embodiment of the present invention.

FIG. 5b is a block diagram of a DSL modem having digital isolation that includes magnetic links in accordance with another embodiment of the present invention. DSL modem 560 functions similarly to DSL modem 500 shown in FIG. 5a. However, DSL modem 560 does not include transformer 540x for transferring the clock signal (CLK). Rather, DSL modem 560 employs a clock recovery technique that allows the clock signal to be recovered (e.g., for purposes of modulation, demodulation and error detection) without actually transferring the clock signal on a separate magnetic link.

In more detail, DSL modem 560 includes IC 561 and IC 562. Note that IC 561 is coupled to the line-side ground plane, while IC 562 is coupled to the system-side ground plane. IC 562 can be similar to IC 502 of FIG. 5a. However, IC 562 does not require a clock signal (CLK) output for the purpose of facilitating modulation or demodulation. IC 561, on the other hand, can be similar to IC 501 of FIG. 5a. However, IC 561 includes a clock recovery module 565 for implementing a clock recovery process. The recovered clock can then be made available for the purpose of facilitating demodulation of the transferred data, as well as modulation of data to be transferred. In alternative embodiments, the components included in either IC 561 and IC 562 can exist as separate circuits or modules. In addition, the components included in either IC 561 and IC 562 can be implemented, for example, in hardware, software, firmware or any combination thereof. Other components that might be included in modem 560, such as line driver 115, filters 120 and 125, and echo cancellation network 110, are not shown in FIG. 5b.

Data Transmitted From the DSP to AFE

The transmission of data from DSP 135 to AFE 130 can be performed as described above with reference to FIG. 5a. In such an embodiment, the output (TXD) of modulator 545 is applied to transformer 540y. The TXD signal is transferred across the magnetic link associated with transformer 540y, and is received by demodulator 510. This received signal (RXD) is then demodulated by demodulator 510. However, in this embodiment, there is no transformer 540x. As such, the clock signal (CLK) is not transferred from DSP 135 via a magnetic link associated with transformer 540x. Rather, clock recovery module 565 is used to recover the clock signal (CLK) that was used in the modulation process performed by modulator 545.

In the embodiment shown, clock recovery module 565 derives the clock signal (CLK) from the received signal (RXD), and makes that clock signal available to, for example, demodulator 510, modulator 515, and error correction 505. The demodulated output data of demodulator 510 can be processed as described above with reference to FIG. 5a, and applied to AFE 130 for conversion to an analog equivalent signal that can be transmitted over the transmission line (not shown).

Data Transmitted From the AFE to DSP

Figure 5C:
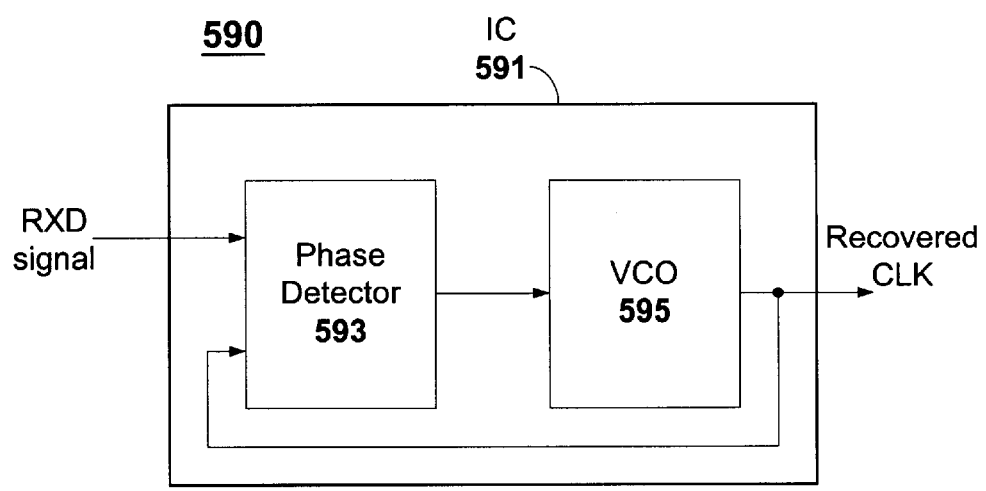
FIG. 5c illustrates a clock recovery technique in accordance with one embodiment of the present invention.

Analog data is received by AFE 130 from the transmission line via the hybrid circuit (not shown). AFE 130 converts the analog data into its digital equivalent and provides that digital data to modulator 515, which modulates the data to a frequency range that will facilitate the transferring of the data through transformer 540z. In this embodiment, the data is modulated using the clock signal (CLK) as a data carrier as previously explained with reference to FIG. 4d. The clock signal is recovered from the received signal (RXD) by clock recovery module 565. FIG. 5c illustrates a clock recovery technique that can be implemented by clock recovery module 565, and will be discussed in turn.

The output (TXD) of modulator 515 is applied to transformer 540z. The TXD signal is transferred across the magnetic link associated with transformer 540z, and is received by demodulator 550. This received signal (RXD) is then demodulated using the clock signal (CLK) made generally available to IC 562 by DSP 135. This clock signal is essentially the same as the clock signal that was recovered by clock recovery module 565, and used in the modulation process performed by modulator 515. The output data of demodulator 550 can then be processed as described with reference to the discussion of FIG. 5a, and ultimately transmitted to the communication system interface (not shown).

As stated with reference to FIG. 5a, various modulation schemes can be employed in accordance with the present invention and in light of this disclosure. Additionally, the discussion relating to power isolation means 215 with reference to FIG. 5a equally applies to FIG. 5b.

FIG. 5c illustrates a clock recovery technique in accordance with one embodiment of the present invention. In the embodiment shown, clock recovery module 565 includes an IC 591 that has a phase detector 593 and a voltage controlled oscillator (VCO) 595. In alternative embodiments, the components included in IC 591 can also exist as separate circuits or modules. In addition, the components included in IC 591 can be implemented, for example, in hardware, software, firmware or any combination thereof. Other components that might be included in clock recovery module 565, such as an amplifier and filter, are not shown in FIG. 5c. Other configurations for implementing a clock recovery scheme will be apparent in light of this disclosure.

The received modulated data (RXD) signal is applied to an input of phase detector 593. Phase detector 593 compares the phase and frequency of the RXD signal with the frequency of VCO 595, and produces a voltage that is proportional to the phase and frequency difference of the RXD signal and the VCO 595 signal. Generally, this voltage includes a first component that represents the sum of the compared frequencies, and a second component that represents the difference of the compared frequencies. A low pass filter can be implemented to attenuate the sum component, and an amplifier can be used to amplify the difference component, which is passed by the filter. This amplified signal is then applied to the input of VCO 595, which causes the frequency of VCO 595 to change so that the frequency difference between the RXD signal and the VCO 595 signal is driven to zero.

Thus, clock recovery module 565 uses the edges of the received modulated signal (RXD) to synchronize a phase-locked loop. The dominant frequency of the received modulated signal (RXD) is the frequency of the clock signal (CLK) that was used to modulate the data included in the received modulated signal (RXD). The phase-locked loop causes VCO 595 to essentially track and lock onto this dominant frequency represented by the clock signal (CLK). As such, the clock signal (CLK) is recovered and produced at the output of IC 591. This clock signal (CLK) can be made available to other processes, such as demodulation, modulation and error correction as shown in FIG. 5b.

Figure 6A:
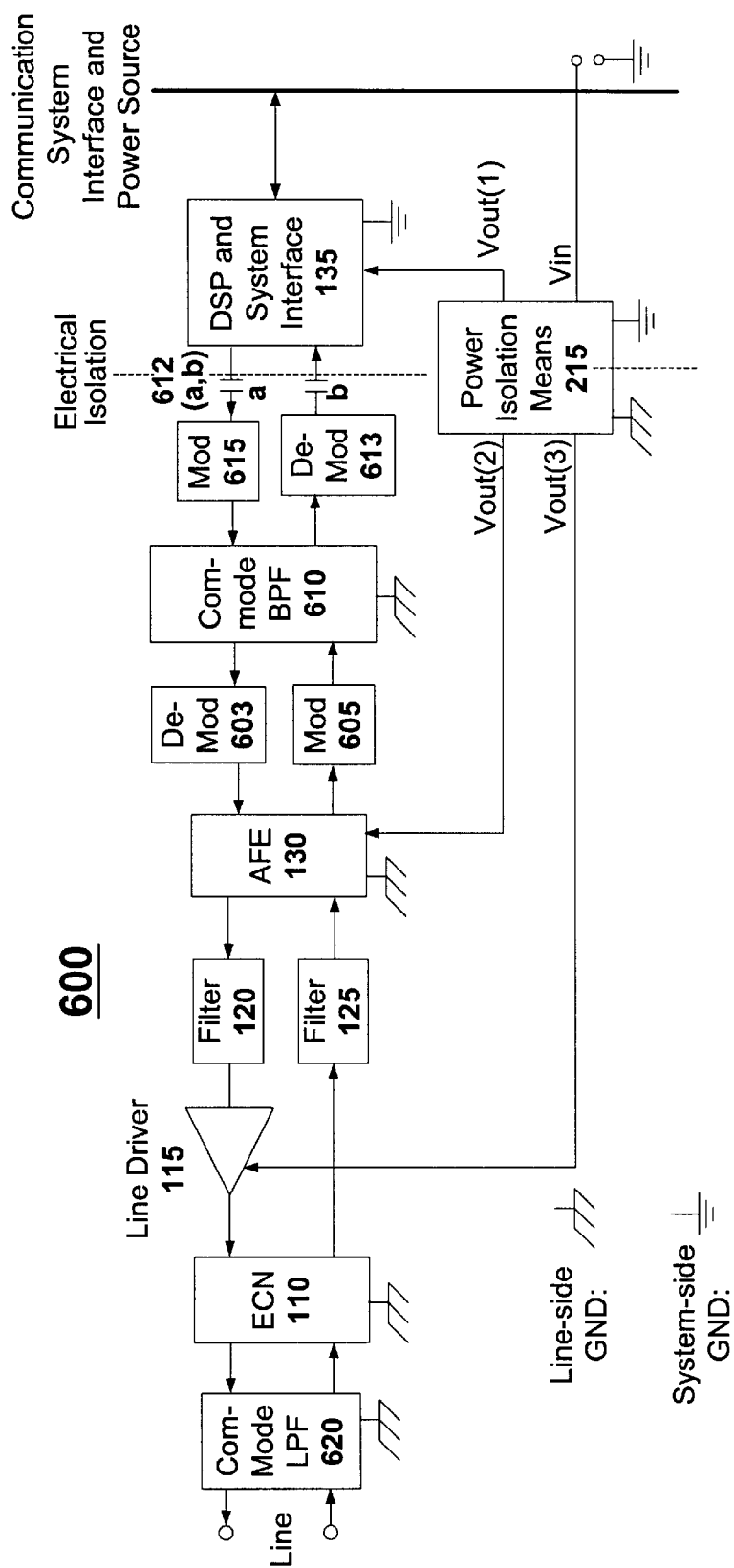
FIG. 6a is a block diagram of a DSL modem having digital isolation that includes capacitors and common-mode filters in accordance with one embodiment of the present invention.

FIG. 6a is a block diagram of a DSL modem having digital isolation that includes capacitors and common-mode filters in accordance with one embodiment of the present invention. This embodiment is similar to the embodiments described in reference to previous figures (e.g., FIG. 2). However, in this embodiment, the digital isolation for transferring duplex data between AFE 130 and DSP 135 employs capacitors and common-mode filters. Thus, the discussion here will focus on how the digital isolation is implemented.

DSL modem 600 includes a common mode low pass filter (LPF) 620 that is coupled between the transmission line and echo cancellation network (ECN) 110, and a common mode bandpass filter (BPF) 610 that is coupled between AFE 130 and DSP 135. In addition, a capacitor 612a and a modulator (Mod) 615 are serially coupled in the transmit data path between DSP 135 and common mode BPF 610. Likewise, a capacitor 612*b* and a demodulator (De-Mod) 613 are serially coupled in the receive data path between common mode BPF 610 and DSP 135. Demodulator 603 is serially coupled between common mode BPF 610 and AFE 130, and is complementary to modulator 615. Similarly, modulator 605 is serially coupled between AFE 130 and common mode BPF 610, and is complementary to demodulator 613.

Capacitors 612 a and b isolate DC and low frequency interference. Because DSL signals are typically baseband-type signals and overlap with other active areas of the electromagnetic spectrum (e.g., AM radio band), there is very strong common-mode interference. Such interference is rejected by the common mode BPF 610, which presents high impedance to common-mode interference, while presenting low impedance to differential signals (e.g., DSL transmit and receive signals). The passband of common mode BPF 610 is selected so that the digital signals can pass. To facilitate the passing of the digital signals though the passband of common mode BPF 610, the digital signals are modulated. from baseband to a frequency range included in the passband. In one embodiment, a phase modulation scheme is employed using a carrier of 30 MHz, and the passband of common mode BPF 610 is approximately 15 to 90 MHz. However, other passbands and modulation schemes can be implemented. The high frequency components (e.g., the carrier frequency) are isolated from the transmission line by common mode LPF 620, which has a substantial impedance (e.g., greater than 1 Mohm) at high frequencies.

Figure 6B:
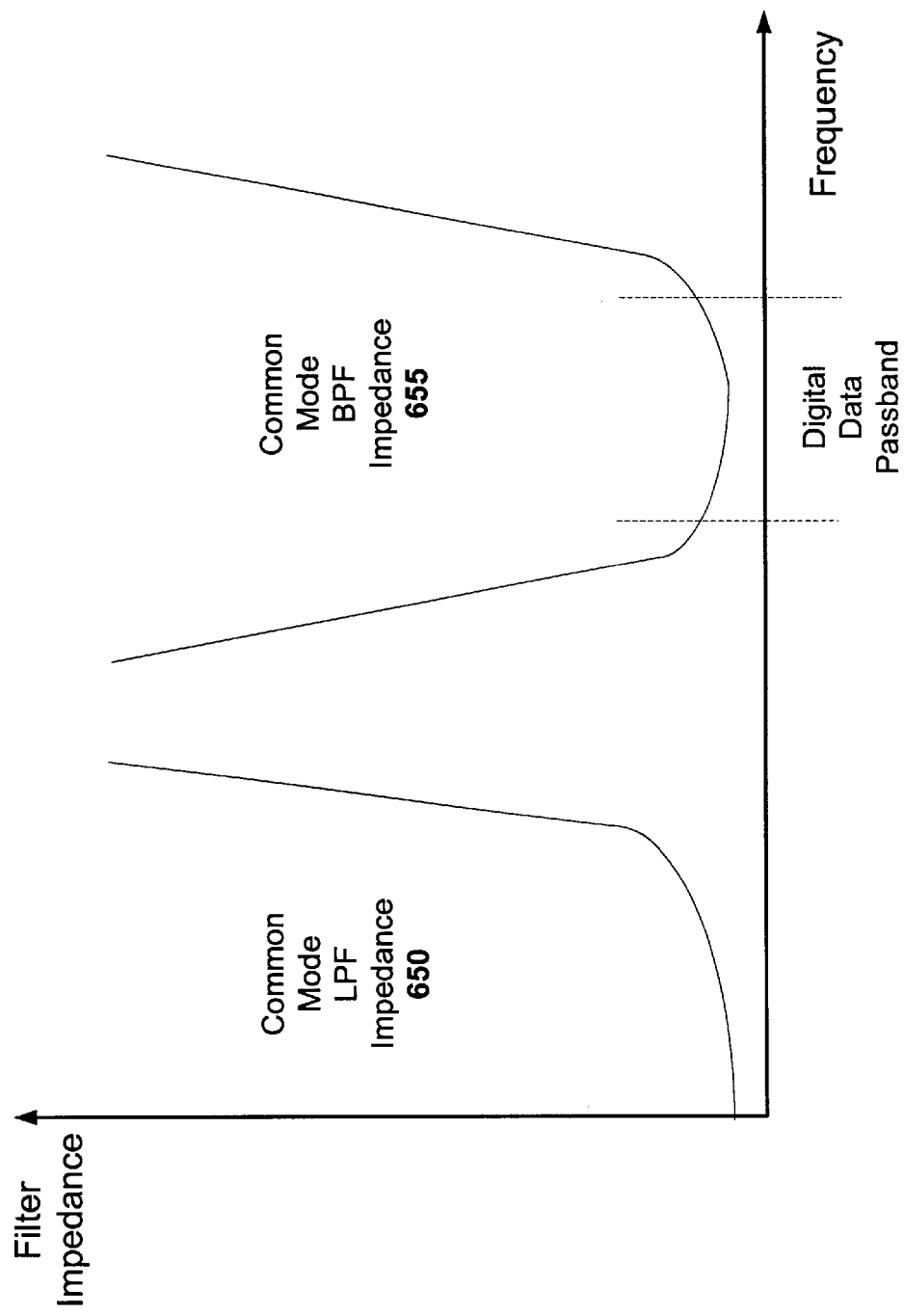

FIG. 6*b* is a graph illustrating the relationship between signal frequency and the impedance of common-mode filters shown in FIG. 6*a*. As can be seen, low frequency signals (e.g., 5 KHz) will be allowed to pass common mode LPF 620 as impedance 650 associated with the common mode LPF 620 is low at such frequencies. Higher frequency signals (e.g., 30 KHz), however, will be isolated by common mode LPF 620 because impedance 650 is substantial at such frequencies. Common mode BPF, on the other hand, is associated width impedance 655. Impedance 655 is substantial at all frequencies outside of the digital data passband, while low at frequencies with the digital data passband.

Figure 7:
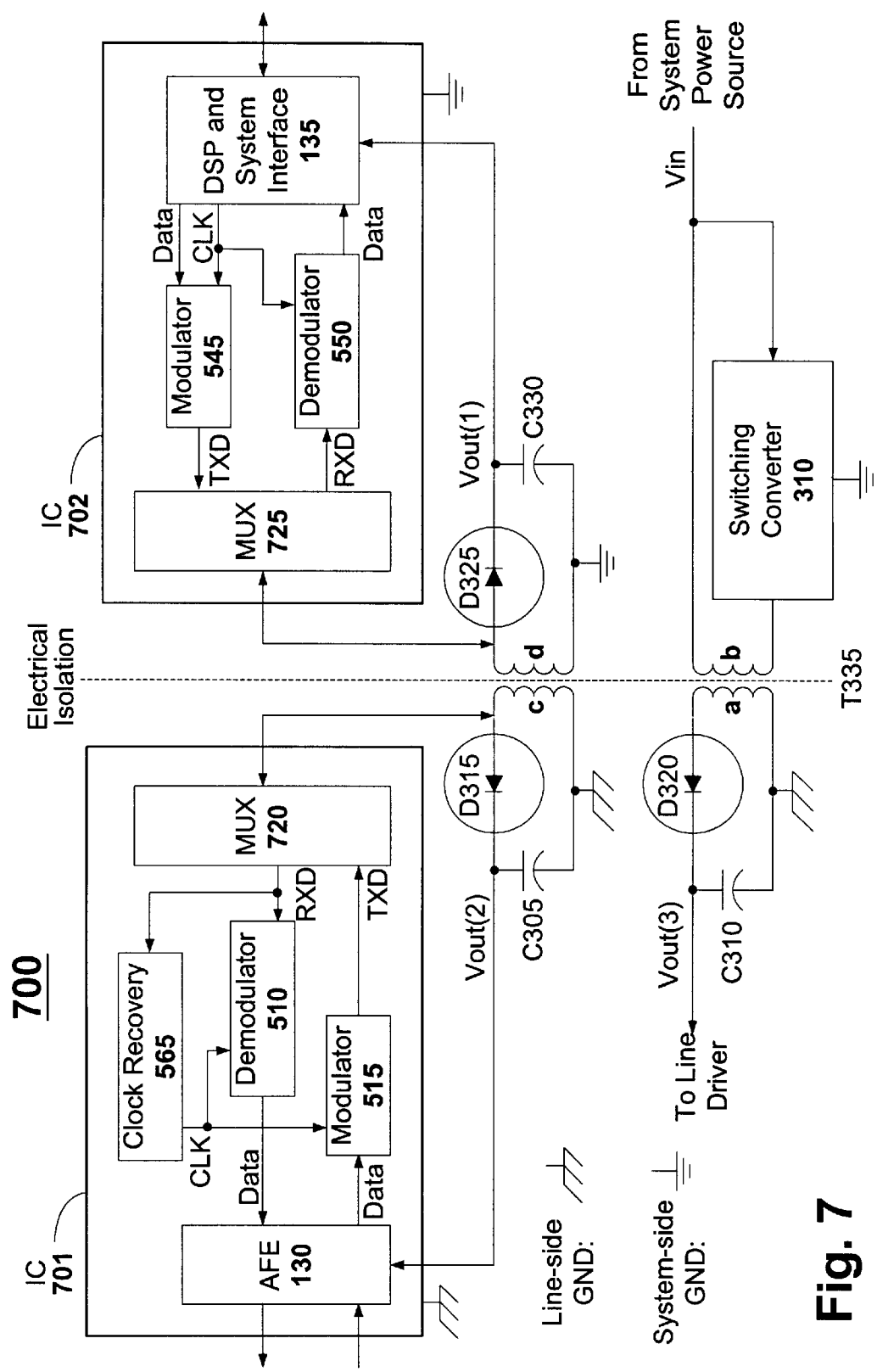
FIG. 7 illustrates digital isolation and power isolation using a common magnetic link in accordance with one embodiment of the present invention.

FIG. 7 is a block diagram of a DSL modem digital isolation and power isolation that includes a magnetic link in accordance with one embodiment of the present invention. DSL modem 700 includes IC 701, IC 702, capacitors 305, 310, and 330, diodes 315, 320, and 325, switching converter 310, and transformer 335. IC 701 further includes AFE 130, demodulator 510, modulator 515, clock recovery module 565, and a multiplexer/de-multiplexer (MUX) 720. IC 702 further includes modulator 545, demodulator 550, DSP 135, and a multiplexer/de-multiplexer (MUX) 725.

The components included in either IC 701 and IC 702 can also exist as separate circuits or modules. In addition, the components included in either IC 701 and IC 702 can be implemented, for example, in hardware, software, firmware or any combination thereof. Other components that might be included in modem 700, such as a line driver, buffers, filters, error correction modules, and a hybrid circuit, are not shown in FIG. 7. The transmission line (not shown) is coupled to modem 700 without a DSL coupling transformer. For instance, in one embodiment, the transmission line is coupled directly to a hybrid circuit included in DSL modem 700. The DSP 135 is coupled to the communication system interface (not shown), and the switching converter 310 and transformer 335 are coupled to the system-side power source (not shown).

Generally, duplex data is modulated, time-multiplexed and applied to a transformer magnetic link that couples AFE 130 and DSP 135. Power isolation is provided by the same transformer, along with any necessary filtering and rectification componentry, as well as a switching converter. In the embodiment shown, power isolation is provided by capacitors 305, 310, and 330, rectifying diodes 315, 320, and 325, switching converter 310, and transformer 335, as explained in reference to FIG. 3.

Recall that switching converter 310 can be configured to cause power to be transferred for only a portion of the switching period associated with switching converter 310. The portion of the switching period where power is being transferred is referred to as the active portion of that switching period. On the other hand, the portion of the switching period where power is being stored (not transferred) is referred to as the non-active portion of that switching period. In such a configuration, power can be transferred across the magnetic link during the active portion of the switching period, and duplex data can be transferred across the magnetic link during the non-active portion of the switching period.

Data Transmitted From the DSP to AFE

The modulation of data from DSP 135 can be performed, for example, as described above with reference to FIG. 5*a* or FIG. 5*b*. Error correction can optionally be implemented, although not shown in FIG. 7. Regardless of the modulation scheme employed (or whether error correction is employed), the output (TXD) of modulator 545 is applied to MUX 725. MUX 725 time-multiplexes the TXD signal. In this embodiment, the transmission of data from MUX 725 to inductor d of transformer 335 is synchronized with the switching period of switching converter 310, such that the TXD signal is transferred across from inductor d to inductor c of transformer 335 during the non-active portion of the switching period of switching converter 310.

The TXD signal is transferred across the magnetic link associated with inductors d and c of transformer 335, and is received by MUX 720. MUX 720 de-multiplexes the received signal, which is then demodulated by demodulator 510. A clock recovery module 565 can be employed so that a recovered clock signal (CLK) can be provided to demodulator 510 as explained in reference to FIG. 5*b*. The demodulated output data of demodulator 510 can be processed, for example, as described above with reference to FIG. 5*a*, and applied to AFE 130 for conversion to an analog equivalent signal that can be transmitted over the transmission line (not shown).

This synchronization of the data transmission from MUX 725 to inductor d of transformer 335 with the switching period of switching converter 310, such that the TXD signal is transferred across from inductor d to inductor c of transformer 335 during the non-active portion of the switching period of switching converter 310, can be achieved in a number of ways. In general, the switching mechanism associated with the switching converter 310 can also be used to synchronize the data transmission.

For example, recall that the switching period associated with the switching converter 310 can be derived from the effects of a power transistor and a PWM as shown in FIG. 3. The pulse output by the PWM alternately switches the power transistor between its on and off states thereby defining the active and non-active portions of the switching period. This pulse output can also be used to control MUXes 720 and 725. Thus, the pulse output effectively indicates to MUXes 720 and 725 the time period when power is being transferred (the active portion of the switching period), and the time period when it is okay to transfer duplex data (the non-active portion of the switching period).

In more detail, a pulse output of the switching converter 310 can be applied to the enable inputs of MUXes 720 and 725 (pulse output and connection to enable inputs not shown). During the active portion of switching converter's 310 switching period, the MUXes 720 and 725 are not enabled (e.g., the pulse output is high and the enable inputs are active low). Thus, MUXes 720 and 725 will not transmit duplex data to respective inductors c and d of transformer 335. However, during the non-active portion of switching converter's 310 switching period (e.g., the pulse output goes low), the MUXes 720 and 725 become enabled and can then transmit duplex data to the magnetic link associated with inductors c and d of transformer 335.

Buffers may be provided to store data that accrues during the active portion of the switching period. In addition, an enable input may be provided at the IC level (e.g., IC 701 and 702). As such, the modulation, multiplexing, and DSP processes of IC 702 can be synchronized with each other. Likewise, the modulation, multiplexing, and conversion processes of IC 702 can be synchronized with each other. Various buffering and enablement schemes will be apparent in light of this disclosure.

In one embodiment, a short delay (e.g., 1 to 10 microseconds) is provided after the enable signal is received and before the duplex data is transmitted to the transformer 335. This delay allows any residual power signals (e.g., short voltage spike caused by leakage inductance of transformer 335) to subside, and any current flowing through the windings of transformer 335 to dissipate. After this brief delay, the magnetic link associated with inductors c and d can be used for transmission of duplex data.

For example, modulated and multiplexed duplex data is transmitted from IC 702 to IC 701 for a first period of time. Then, modulated and multiplexed duplex data is transmitted from IC 701 to IC 702 for a second period of time. The duration of duplex data transmission for each direction (from IC 701 to IC 702, and vice versa) depends on a number of factors such as the minimum duration of the non-active portion of the switching period, and any delay to compensate for residual power signals. For instance, given that the minimum duration of the non-active portion of the switching period is 100 microseconds and a 2 microsecond delay is required to allow for residual signal bleed off, there is approximately a 98 microsecond window available for duplex data transmission. This allocated time can be split evenly, meaning data can be transmitted from IC 701 to IC 702 (e.g., downstream) for about 49 microseconds, and from IC 702 to IC 701 (e.g., upstream) for about 49 microseconds. Alternatively, the downstream transmission can be sustained for a longer period than the upstream transmission, or vice versa.

Regardless of the duty cycle for up and down stream transmission of duplex data, both transmissions must stop before the active portion of the switching period begins. Knowing the minimum value of the non-active portion of the switching period, and the duration of typical residual power-related signals allows for a calculation of total duplex data transmit time, and enables a reliable data transmission. Once the active portion of the switching period begins, only power is transferred across the magnetic link of transformer 335. Thus, the alternate transfer of power and duplex data repeats itself as the pulse output of the switching converter 310 changes states.

In an alternate embodiment, the rising or falling edges of the power signal transferred to from inductor b to inductor d of transformer 335 can be detected. Such edges, in conjunction with a known switching converter 310 duty cycle, can be used to synchronize the transfer of data (e.g., from MUX 725 to the magnetic link of transformer 335) to the non-active portion of the switching period of switching converter 310.

For example, assume that MUX 725 has an external clocking or trigger input coupled to transformer 335 at inductor d. During the active portion of the switching period of switching converter 310, power is transferred from inductor b to inductors a, c, and d of transformer 335. As such, the power signal at inductor d exceeds a certain threshold voltage (e.g., 2.5 volts). At the end of the active portion of the switching period, the transfer of power from inductor b to inductors a, c, and d of transformer 335 is stopped by action of switching converter 310. Thus, the power signal at inductor d drops back below the threshold voltage. The falling edge associated with the power signal at inductor d dropping below the threshold voltage can be detected at the clocking or trigger input of MUX 725 thereby triggering the transmission of data from MUX 725 to inductor d during the non-active portion of the switching period. The duration of this transmission of data from MUX 725 to inductor d depends, for example, on the switching period and the duty cycle associated with switching converter 310. The data is then transferred over the magnetic link associated with inductors d and c of transformer 335, and applied to IC 701 for de-multiplexing and demodulation as explained above.

Data Transmitted From the AFE to DSP

Analog data is received by AFE 130 from the transmission line via the hybrid circuit (not shown). AFE 130 converts the analog data into its digital equivalent and provides that digital data to modulator 515, which modulates the data to a frequency range that will facilitate the transferring of the data across the magnetic link formed by inductors c and d of transformer 335. The modulation process can be performed, for example, as described above with reference to FIG. 5a or FIG. 5b, using clock recovery module 565. The output (TXD) of modulator 515 is applied to MUX 720. MUX 720 time-multiplexes the TXD signal. The transmission of data from MUX 720 to inductor c of transformer 335 is synchronized with the switching period of switching converter 310, such that the TXD signal is transferred from inductor c to inductor d of transformer 335 during the non-active portion of the switching period of switching converter 310. The previous discussion regarding synchronization techniques equally applies here.

The TXD signal is transferred across the magnetic link associated with inductors c and d of transformer 335, and is received by multiplexer 725, which de-multiplexes the received signal. The de-multiplexed signal (RXD) is then demodulated by demodulator 550 using the clock signal (CLK) made available to IC 702 by DSP 135. This clock signal is essentially the same as the clock signal that was recovered by clock recovery module 565, and used in the modulation process performed by modulator 515. The output data of demodulator 550 can then be processed as described with reference to the discussion of FIG. 5a, and ultimately transmitted to the communication system interface (not shown).

As stated with reference to FIGS. 5a and 5b, various modulation schemes can be employed in accordance with the present invention and in light of this disclosure.

Additionally, various synchronization mechanisms can be employed, in accordance with the present invention and in light of this disclosure, to ensure power is transferred by transformer 335 during the active portion of the switching period, and data is transferred by transformer 335 during the non-active portion of the switching period.

The foregoing description of the embodiments of the invention has been presented for the purposes of illustration and description. It is not intended to be exhaustive or to limit the invention to the precise form disclosed. For example, digital isolation can be achieved by operatively coupling opto-couplers (e.g., one in the transmit path and one in the receive path) between the analog front-end and the digital signal processor. Many modifications and variations are possible in light of the above teaching. It is intended that the scope of the invention be limited not by this detailed description, but rather by the claims appended hereto.

What is claimed is:

1. A DSL modem for coupling a transmission line to a communication system interface, the modem comprising:

an analog front-end for converting an analog communication signal received from the transmission line to its digital equivalent;

a digital signal processor for processing the digital equivalent of the analog communication signal;

a digital isolation means operatively coupled between the analog front-end and the digital signal processor, the digital isolation means for electrically isolating the analog front-end from the digital signal processor; and a power isolation means receiving input power from the communication system interface, the power isolation means having a first output coupled to the analog front-end, and a second output coupled to the digital signal processor, the power isolation means for electrically isolating the input power from the first and second outputs.

2. The modem of claim 1, wherein the digital equivalent is associated with a first frequency spectrum, and the digital isolation means includes a modulator for modulating the digital equivalent to a second frequency spectrum, and for communicating the modulated digital equivalent to the digital signal processor via a magnetic link.

3. The modem of claim 1, wherein the first output is electrically isolated from the second output of the power isolation means by a magnetic link.

4. The modem of claim 1, wherein the digital isolation provided by the digital isolation means and the power isolation provided by the power isolation means are derived from a common magnetic link.

5. A DSL modem for coupling a transmission line to a communication system interface, the modem comprising:

a digital isolation means operatively coupled between an analog front-end having a first ground and a digital signal processor having a second ground, the digital isolation means for electrically isolating the first ground from the second ground; and a power isolation means receiving input power from the communication system interface, the power isolation means having a first power output coupled to the analog front-end, and a second power output coupled to the digital signal processor, the power isolation means for electrically isolating the input power output from the first and second power outputs.

* * * * *